United States Patent
Massano et al.

(10) Patent No.: US 9,435,252 B2
(45) Date of Patent: Sep. 6, 2016

(54) ACTIVE CONDITIONING SYSTEM OF A GASEOUS FLUID INTAKE OF AN INTERNAL COMBUSTION ENGINE

(71) Applicant: DENSO THERMAL SYSTEMS S.p.A., Poirino (Turin) (IT)

(72) Inventors: Cristiano Massano, Poirino (IT); Matteo Biglia, Turin (IT); Gabriele Maione, Poirino (IT)

(73) Assignee: Denso Thermal Systems S.P.A., Poirino (Turin) (IT)

(*) Notice: Subject to any disclaimer, the term of this patent is extended or adjusted under 35 U.S.C. 154(b) by 40 days.

(21) Appl. No.: 14/323,442

(22) Filed: Jul. 3, 2014

(65) Prior Publication Data

US 2015/0007561 A1  Jan. 8, 2015

(30) Foreign Application Priority Data

Jul. 5, 2013 (IT) .............................. TO2013A0565

(51) Int. Cl.
  *F02B 29/04* (2006.01)
  *F02M 31/04* (2006.01)
  *F02M 31/20* (2006.01)
  (Continued)

(52) U.S. Cl.
  CPC ....... *F02B 29/0493* (2013.01); *F02B 29/0412* (2013.01); *F02B 29/0418* (2013.01); *F02B 29/0437* (2013.01); *F02B 33/443* (2013.01); *F02D 41/0027* (2013.01);
  (Continued)

(58) Field of Classification Search
  CPC ............ F02B 29/0412; F02B 29/0418; F02B 29/0437; F02B 29/0493; F02B 33/443; F02M 31/042; F02M 31/205; F02D 41/0027; F02N 19/02

USPC .............................................. 60/599; 123/563
  See application file for complete search history.

(56) References Cited

U.S. PATENT DOCUMENTS 4,215,550 A * 8/1980 Dinger et al. .................. 60/606
6,230,683 B1 * 5/2001 zur Loye .................. F02B 1/12
                                                123/27 GE (Continued)

FOREIGN PATENT DOCUMENTS

EP  1496221 A2  1/2005
FR  2381175 A1  9/1978
(Continued)

OTHER PUBLICATIONS

Italian search report for application TO20130565 dated Apr. 9, 2014.

(Continued)

*Primary Examiner* — Audrey K Bradley
(74) *Attorney, Agent, or Firm* — Patterson & Sheridan, LLP

(57) ABSTRACT

Intake system for a supercharged internal combustion engine, comprising an intake duct with a cooling line comprising a high temperature cooler and a lower temperature cooler arranged in series along the intake duct, and a by-pass branch arranged in parallel with the low temperature cooler, and a heating line with a heater. The heating line is arranged in parallel with the cooling line. The intake system is configured so that it may be modulated between a heating mode, where the gaseous intake fluid is heated through the heater, and a cooling mode, where the gaseous intake fluid is cooled through at least one of the high temperature cooler and the low temperature cooler.

4 Claims, 3 Drawing Sheets

(51) Int. Cl.
 F02B 33/44 (2006.01)
 F02D 41/00 (2006.01)
(52) U.S. Cl.
 CPC ........ F02M 31/042 (2013.01); F02M 31/205 (2013.01); *Y02T 10/126* (2013.01); *Y02T 10/146* (2013.01)

(56) References Cited

U.S. PATENT DOCUMENTS

| | | | |
|---|---|---|---|
| 6,684,840 B1 * | 2/2004 | Nishimura et al. | 123/184.21 |
| 2008/0295811 A1 | 12/2008 | Holler et al. | |
| 2011/0088664 A1 | 4/2011 | Leroux et al. | |
| 2012/0214077 A1 * | 8/2012 | Garrettson et al. | 429/429 |

FOREIGN PATENT DOCUMENTS

| | | |
|---|---|---|
| GB | 2055963 A | 3/1981 |
| JP | S6165015 A | 4/1986 |

OTHER PUBLICATIONS

Guhr, et al., "Turbocharging With Low Temperature Charge Air Cooling and EGR," Development Supercharging, MTZ Oct. 2012, pp. 44-52, vol. 73.

* cited by examiner

ACTIVE CONDITIONING SYSTEM OF A GASEOUS FLUID INTAKE OF AN INTERNAL COMBUSTION ENGINE

The present invention relates in general to the systems for conditioning the gaseous fluids (air or recirculated exhaust gas/air mixtures) supplied to the inlet of internal combustion engines.

It is known that, during the design of the systems supplying air or gas/air mixtures into internal combustion engines, problems of a varying nature are encountered and require the conditioning of the fluids entering the engine.

In particular, the increasingly more stringent emission standards require a continuous technological effort in order to improve the performance characteristics; each parameter which affects the fuel consumption and the emission levels is therefore the subject of research aimed at achieving said improvement.

In this connection, the development of a system which ensures an optimum temperature progression of the intake air in any driving conditions (from engine warm-up to the WOT (wide open throttle) condition) may become an important instrument for achieving compliance with the future engine emission standards.

Moreover, the tendency towards down-sizing which is common among motor vehicle manufacturers requires the development of solutions with a high specific power, in particular by using a turbocompressor which compresses the intake air.

In the past different systems for controlling the temperature of the intake air have been developed and applied to mass-production.

For example, some manufacturers have developed a by-pass system for an air-fed intake air cooler, used to reduce the CO/HC emissions during engine warm-up.

Another manufacturer has instead proposed a method for modulating the flow—generated by an auxiliary electric pump—of the water which supplies an intake an cooler in order to maintain a constant temperature of the intake gases at the engine inlet. The aforementioned pump is kept inactive during the engine warm-up phase, until a target temperature is reached.

This technology was developed further as described in US 2011/0088664. This publication describes an intake system comprising a water-fed intake air cooler and an additional by-pass branch, which are controlled by means of a double valve. As a result of the aforementioned arrangement it is possible to cool selectively, cool in a partial manner or not cool at all the intake air being charged into the engine depending on the speed of the latter.

In particular, the present invention relates to an intake system for a supercharged internal combustion engine, comprising
an intake duct having a first end connectable to a supercharger compressor and a second end connectable to a plurality of cylinders of the engine for supplying a gaseous intake fluid to said cylinders, wherein said intake duct includes a cooling line comprising:
a high temperature cooler and a low temperature cooler arranged in series along said intake duct and supplied with a cooling fluid for cooling the gaseous intake flow; and
a by-pass branch arranged in parallel with said low temperature cooler, said bypass branch and said low temperature cooler being selectively connected to an outlet of said high temperature cooler.

A system of this type is described, in the article "Turbocharging with low temperature charge air cooling and EGR" by Carsten Guhr and flans Zellbeck (MTZ 10/2012, vol. 73, pp. 44-52)". Such a system was proposed in order to improve the dynamic behaviour of petrol engines, in particular under load conditions at low speed. An increase in the efficiency of the engine under stationary conditions and in the vicinity of the maximum operating torque curve was also identified.

An object of the present invention is to propose a system able to follow in a relatively more precise manner a desired optimum temperature curve of the gaseous intake fluid under all driving conditions.

This object is achieved according to the invention by an intake system of the type defined above, further comprising a heating line with a heater for heating the gaseous intake fluid, said heating line being arranged in parallel with said cooling line, wherein said intake system is configured so that it may be modulated between a heating mode, where the gaseous intake fluid is heated through said heater, and a cooling mode where the gaseous intake fluid is cooled through at least one of said high temperature cooler and low temperature cooler.

As may be understood, such a system has a high number of degrees of freedom owing to the fact that it is based on different adjustment parameters (intake fluid flows respectively distributed to heater and coolers, electric power supplied to the heater, cooling fluid flows supplied to the coolers); in this way, the adjustment may be performed so as to approximate in the most precise manner possible an ideal temperature curve.

Preferred embodiments of the invention are defined in the dependent claims which are to be understood as forming an integral part of the present description.

Further characteristic features and advantages of the intake system according to the invention will become more clear from the following detailed description of an embodiment of the invention with reference to the attached drawings which are provided purely by way of a non-limiting example and in which.

Figure 1:
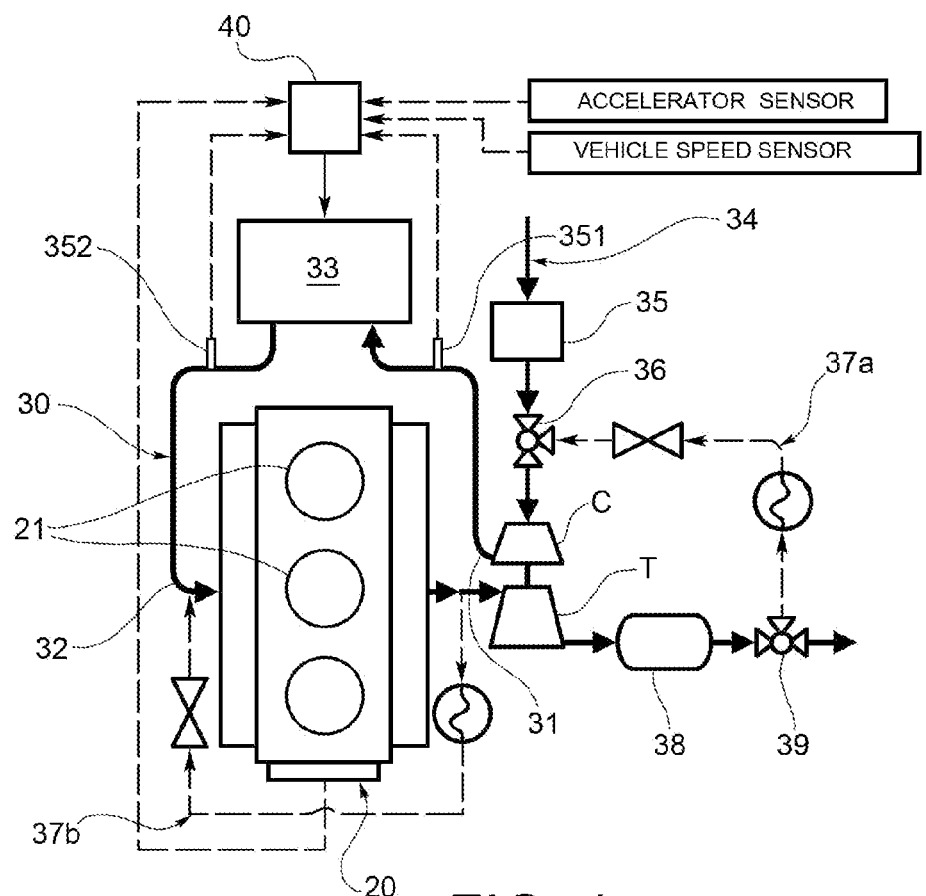
FIG. 1 is a diagram which shows an intake system according to the present invention.

FIG. 1 shows a conventional internal combustion engine 20 comprising a plurality of cylinders 21 and an intake duct 30, a first end 31 of which is connected to the inlet of a supercharger compressor C and a second end 32 of which is connected to the inlet of cylinders 21 of the engine, for supplying a gaseous intake fluid. This gaseous fluid may be air or a recirculated exhaust gas/air mixture in the case of engines in which recirculation of the engine exhaust gases is used.

The engine 10 may be a supercharged engine with ignition by means of compression (for example a diesel engine) or as supercharged engine with controlled ignition (for example a petrol engine).

The intake duct 30 further comprises a conditioning module 33 according to the present invention for conditioning the gaseous intake fluid, which will be described in detail below. FIG. 1 also shows a conventional external air supply duct 34, which is connected to the inlet of the compressor C for supplying external air to the intake duct 30 and along which an air filter 35 and a diverter valve 36 are arranged. A recirculation duct 37a (optional) for recirculating the exhaust gases is also conventionally connected to the inlet of the diverter valve 36. FIG. 1 also shows a turbine T which is rotationally driven by the exhaust gases of the engine and is rotationally integral with the compressor C, a post-treatment component 38 for treating the exhaust gases, and a diverter valve 39 for selectively directing the exhaust gases to the recirculating duct 37 or to a discharge system. FIG. 1 also shows a high-pressure recirculation duct 37b conventionally provided for recirculating the high-pressure discharge gases which may or may not be present depending on the application conditions.

Figure 2:
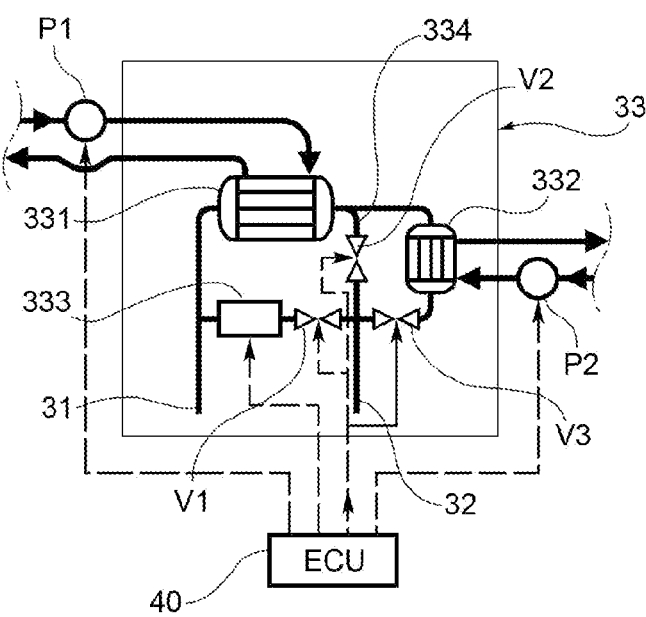
FIG. 2 is a diagram which shows a conditioning module for the intake system according to FIG. 1.

With reference also to FIG. 2, the conditioning module 33 comprises a high temperature cooler 331, a low temperature cooler 332 and a heater 333. "Module" is understood as meaning that the aforementioned components ma be integrated/assembled inside as supporting and interconnecting structure so as to form a single construction unit.

The high temperature cooler 331 is supplied with a cooling fluid, in particular water (mixture of water and ethylene glycol or other refrigerating substance) and is connected to a cooling fluid supply circuit, comprising a pump P1.

The low temperature cooler 332 is supplied with a cooling fluid, in particular water (mixture of water and ethylene glycol or other refrigerating substance) and is connected to a second cooling fluid supply circuit, comprising a pump P2. The conditioning of the cooling fluid circulating in the aforementioned low temperature supply circuit is performed using known technical systems; the low temperature circuit is used for supplying directly the low temperature cooler and, alternatively or in combination, a tank storing the low temperature fluid which may be present in the circuit, and provided in order to supply the low temperature cooler during the rapid transient phases of the engine. In an alternative embodiment a single power supply circuit which supplies both the coolers 331 and 332 may be provided.

The heater 333 is an electric heater, for example a heater with a heating resistance which has a positive temperature coefficient (PTC) behaviour.

Within the cooling duct 30 the high temperature cooler 331 and the low temperature cooler are arranged in series and form part of a cooling line for cooling the gaseous intake fluid; the heater 333 forms part of a heating line for heating the gaseous intake fluid. The heating line comprising the heater 333 is arranged in parallel with the cooling line comprising the coolers 331 and 332. A first regulating valve V1 is connected to the outlet of the heater 333 in order to modulate the flow of gaseous fluid through the heater 333 between a closed position and an open position of the regulating valve V1.

The cooling line also includes a by-pass branch 334 arranged in parallel with the low temperature cooler 332; the by-pass branch 334 and the low temperature cooler 332 are selectively connected to the outlet of the high temperature cooler 331. In particular, a second regulating valve V2 is arranged on the by-pass branch 334 in order to modulate the gaseous fluid flow through the by-pass branch 334 between a closed position and an open position of the regulating valve V2, and a third regulating valve V3 is arranged at the outlet of the low temperature cooler 332 in order to modulate the gaseous fluid flow through the low temperature cooler 332 between a closed position and an open position of the regulating valve V3. The regulating valves V1, V2, V3 may be integrated in a single multi-way complex valve body and, from a constructional point of view, may also form part of the conditioning module 33. More generally, valve means may be arranged along at least one of said healing line and cooling line in order to modulate the gaseous fluid flow through them and in particular may be associated with the heater 333, the by-pass branch 334 and the low temperature cooler 332, respectively, optionally with an arrangement different from that shown in the figures.

A control unit 40, which may be an engine control unit (ECU), is also provided for managing the regulating valves V1, V2, V3 and the electric power supply to the heater 333 and to the pumps P1, P2 of the circuits supplying the high temperature cooler 331 and the low temperature cooler 332, as indicated by the broken line arrows shown in FIG. 2. The control unit ECU manages operation of the aforementioned devices depending on the vehicle conditions. In order to detect the driving conditions of the vehicle, a series of sensors are operationally associated with the control unit 40. In particular, the control unit 40 receives and processes signals which are provided by an optional inlet temperature sensor 351 and an outlet temperature sensor 352 and which indicate the temperature of the gaseous intake fluid at the inlet (compressor side) and at the outlet (engine side) of the conditioning module 33. The control unit 40 further receives and processes signals which are provided by a speed sensor and accelerator sensor and which respectively indicate the speed of the vehicle (or the engine) and the acceleration required for the vehicle, for example by means of pressure on an accelerator pedal. The construction and methods of positioning the aforementioned sensors are per se conventional and not essential for the purposes of the present invention. The signals provided by the various sensors are represented by the broken line arrows shown in FIG. 1.

The control unit 40 may be programmed to manage the intake system so as to follow approximately an optimum temperature curve of the hot gaseous thud which may be defined at the design stage for the specific engine on the basis of different parameters such as for example:

Type of engine (petrol, diesel, etc.);
Temperature conditions of engine (warm-up, normal operating conditions, extreme external conditions and load conditions, etc.);
Speed and torque required of engine;
Current speed and torque of the engine.

Figure 3:
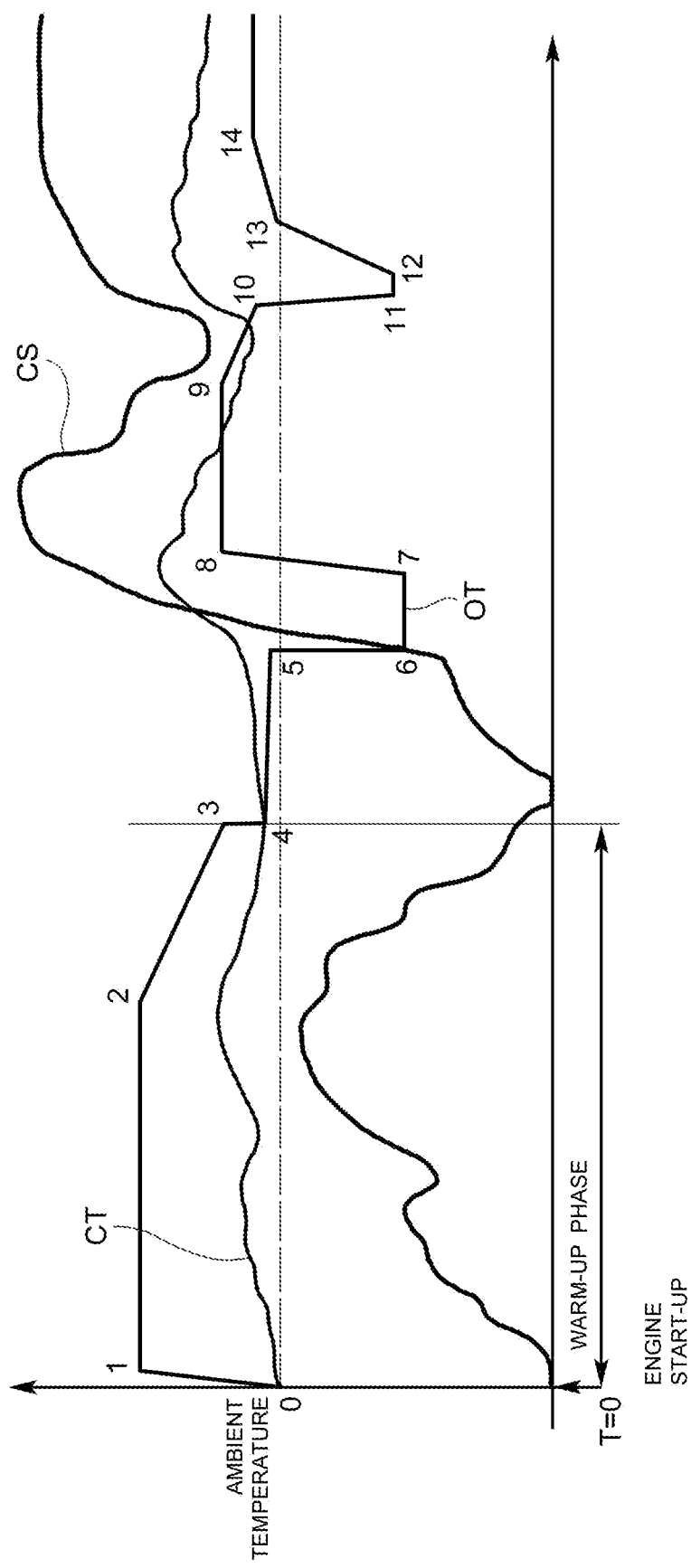
FIG. 3 is a graph which compares a temperature curve of the intake air in a system with a conventional cooler and an optimum temperature curve, upon variation in the driving conditions of a motor vehicle.

For example, FIG. 3 shows, as a function of the time, a possible speed curve CS of a vehicle subject to different driving conditions, starting from switch-on of the engine at the instant t=0. A broken line indicates the ambient temperature which is assumed to be constant. FIG. 3 also shows a possible temperature curve CT of the gaseous intake fluid (at the engine inlet) in a conventional system provided with an intake fluid cooler, corresponding, to the variations in speed of the vehicle, represented by the curve CS. FIG. 3 also shows a possible optimum temperature curve OT of the gaseous intake fluid at the motor inlet, which is defined as being "optimum" in that it optimizes the efficiency and the reduction in the emissions of the engine during the specific driving conditions represented by the curve CS and under constant ambient temperature conditions considered in the example. In an intake system according to the invention the control unit 40 may be programmed to manage the various components of the system so as to follow more precisely the optimum curve OT.

Figure 4:
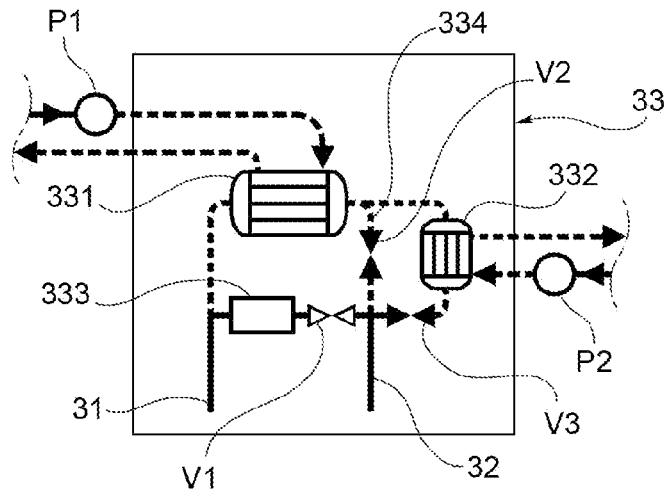
FIGS. 4 to 6 show the conditioning module according to FIG. 2 in different operating modes associated with respective driving conditions of the motor vehicle.

Following starting of the engine and during the warm-up phase from point 0 to point 4 in FIG. 3), the control unit 40 may adjust the regulating valves so that the valve V1 is open and the valves V2 and V3 are closed, such that all the intake fluid passes through the heater 333 (see FIG. 4); this may improve the performance of the engine and reduce the HC and CO emissions during warm-up.

Figure 5:
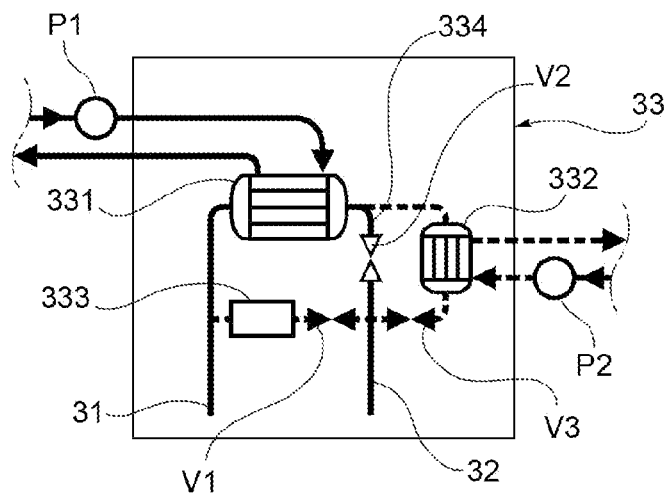

Under normal driving conditions (from point 4 to point 5, from point 8 to point 10, and from point 13 onwards), the control unit 40 may adjust the regulating valves so that the valves V1 and V3 are closed and the regulating valve V2 is open, such that all the intake fluid passes through the high temperature cooler 331 (see FIG. 5) and adjust (by means of the pump P1) the cooling fluid flow to the cooler 331 so as to modulate the quantity of heat per unit of time extracted from the gaseous fluid intake flow. This may reduce or eliminate deterioration of the engine performance during normal travel.

Figure 6:
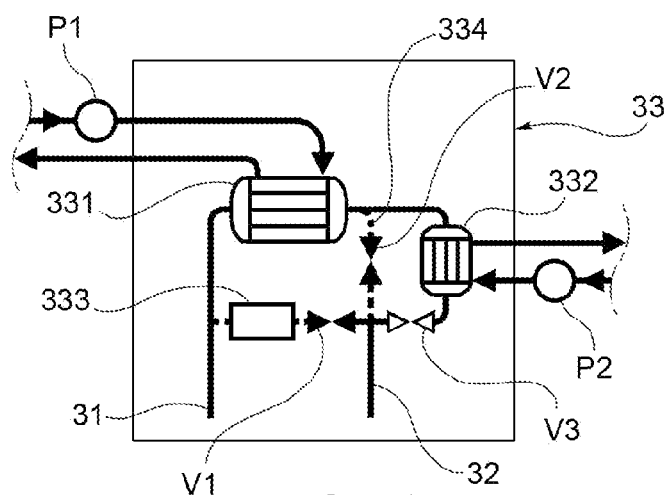

In a condition where an acceleration is required starting from low engine speeds (from point 5 to point 8, and from point 10 to point 13), the control unit 40 may adjust the regulating valves so that the valve V1 is closed and the valves V2 and V3 are open, such that all the intake fluid passes not only through the high temperature cooler 331 but also through the low temperature cooler 332 (see FIG. 6) and adjust (by means of the pumps P1 and P2) the cooling fluid flow to the coolers 331 and 332 so as to modulate the quantity of heat per unit of time extracted from the gaseous fluid intake flow. In low speed engine conditions, the additional cooling provided by the low temperature cooler 332 may improve the dynamic behaviour of the engine and reduce the turbo-lag, with a consequent improvement in the drivability of the engine.

It is also possible to contemplate further operating configurations of the intake system according to the invention, in addition to those described above, such as configurations with partial opening of one or more of the regulating valves V1, V2 and V3, so as to determine the flow of different fractions of the intake fluid through the heater 333 and the coolers 331 and 332, respectively, and perform subsequent mixing thereof so as to obtain an even finer adjustment of the temperature of the intake fluid at the engine inlet.

The invention claimed is:

1. Intake system for a supercharged internal combustion engine of a motor vehicle, comprising:
 an intake duct having a first end connectable to a supercharger compressor and a second end connectable to a plurality of cylinders of the engine for supplying a gaseous intake fluid to said cylinders, wherein said intake duct includes a cooling line comprising:
  a high temperature cooler and a low temperature cooler arranged in series along said intake duct and supplied with a cooling fluid for cooling the gaseous intake fluid, said cooling fluid being supplied by a feed system onboard the motor vehicle; and
  a by-pass branch arranged in parallel with said low temperature cooler, said bypass branch and said low temperature cooler being selectively connected to an outlet of said high temperature cooler;
 said intake system further comprising a heating line having an electric heater for heating the gaseous intake fluid, said heating line being arranged in parallel with said cooling line, wherein said intake system is configured so that it is modulatable between a heating mode, where the gaseous intake fluid is heated through said heater, and a cooling mode, where the gaseous intake fluid is cooled through at least one of said high temperature cooler and low temperature cooler,
 wherein the intake system further comprises valve devices arranged along said heating line and cooling line for modulating the flow of the gaseous fluid through them, and
 wherein said valve devices comprise a first valve device connected to an outlet of the heater and arranged downstream of the heater, a second valve device arranged on the by-pass branch, and a third valve device connected to an outlet of the low temperature cooler and arranged downstream of the low temperature cooler,
 said intake system further comprising a control unit programmed for modulating the intake system between the heating mode and the cooling mode depending on driving conditions of the vehicle determined by means of a plurality of sensors associated with the control unit,
 wherein said sensors comprise an outlet temperature sensor for providing a signal indicating the temperature of the gaseous intake fluid downstream of the intake system, a speed sensor for providing a signal indicating a vehicle speed, and an accelerator sensor for providing a signal indicating an acceleration requested for the vehicle.

2. System according to claim 1, wherein said heater, high temperature cooler, low temperature cooler and, optionally, said valve devices are integrated in a single conditioning module.

3. System according to claim 1, wherein said control unit is an engine control unit.

4. System according to claim 1, wherein said sensors further comprise an inlet temperature sensor for providing a signal indicating the temperature of the gaseous intake fluid at an inlet of the intake duct, downstream of the supercharger compressor.

* * * * *